O. Z. HOWARD.
MIXING AND AGITATING MECHANISM FOR EXTRACTOR VATS, &c.
APPLICATION FILED SEPT. 14, 1916.

1,258,334.

Patented Mar. 5, 1918.
3 SHEETS—SHEET 1.

Inventor,
Oliver Z. Howard,
by his Attorney,
John R. Nolan

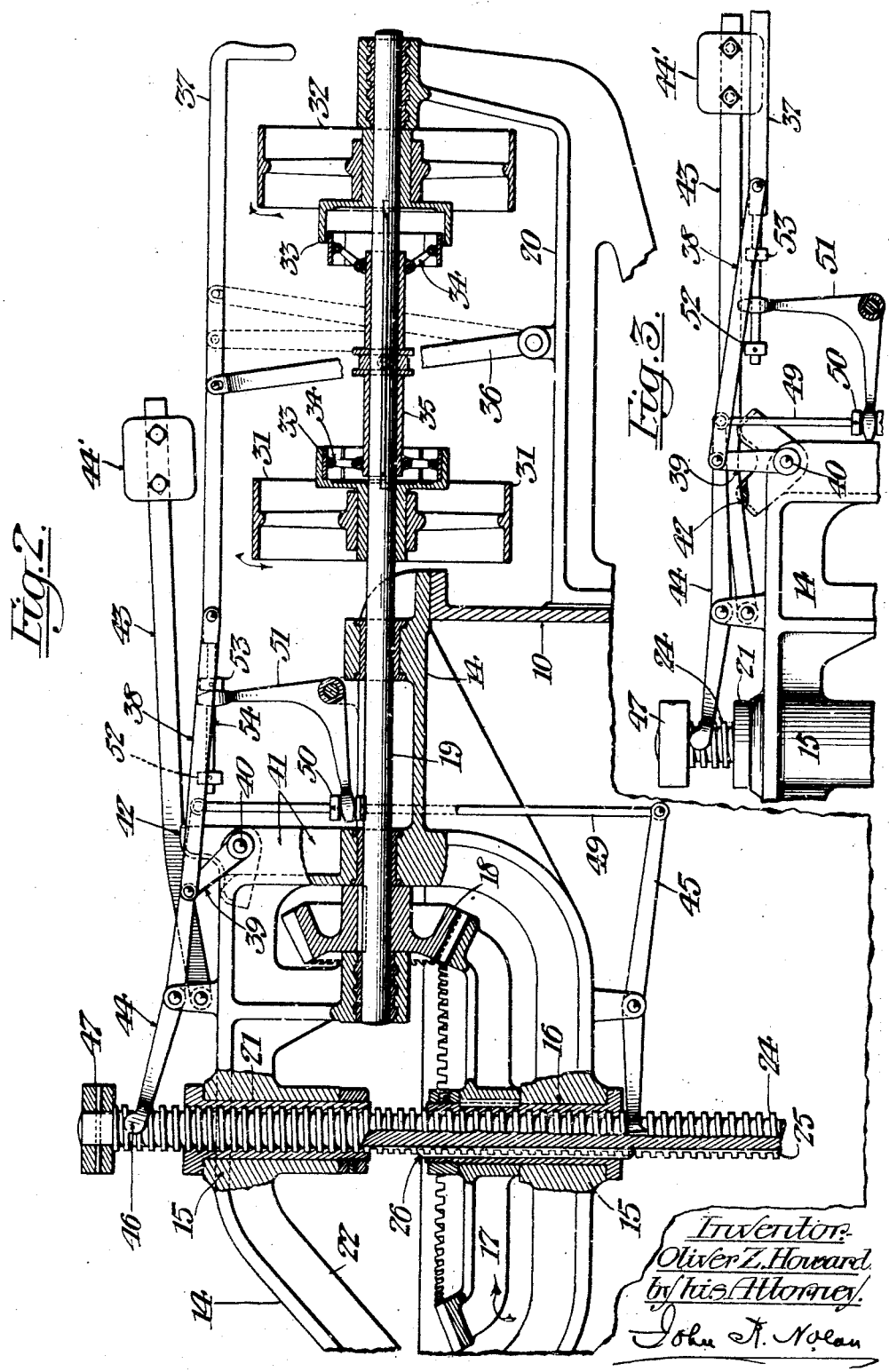

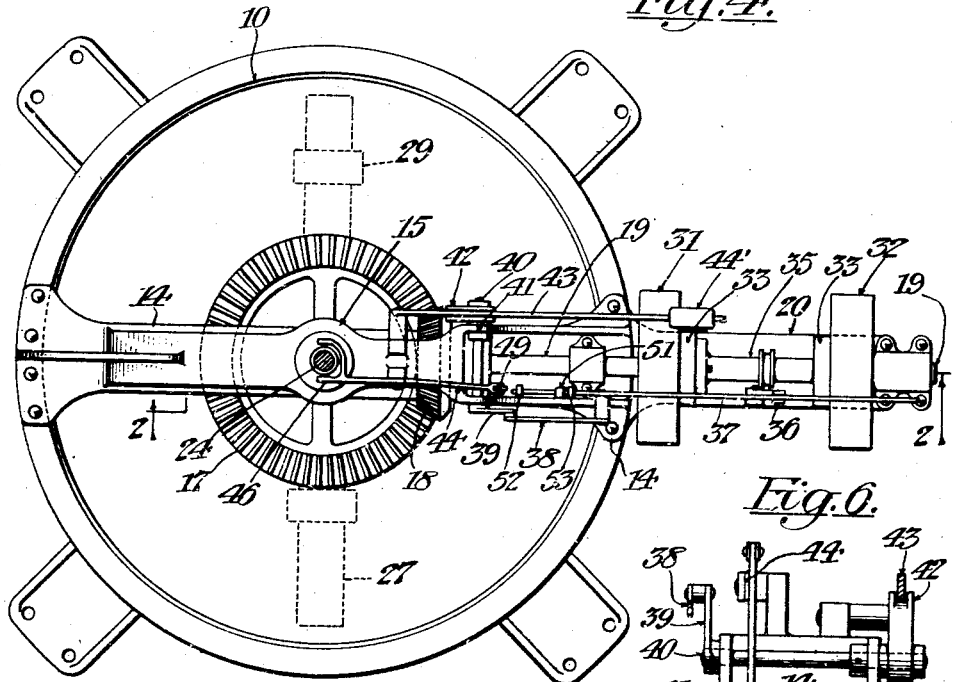
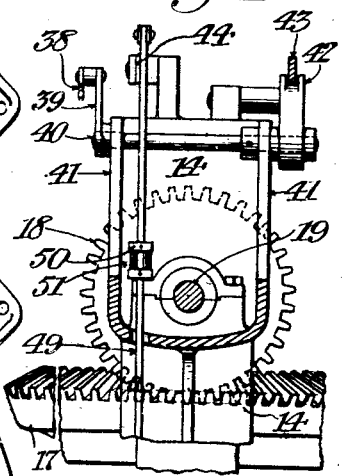
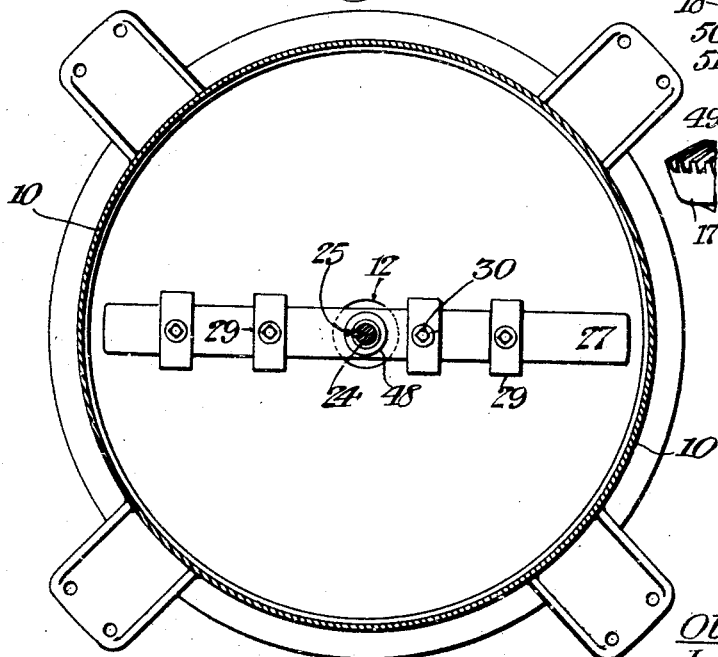
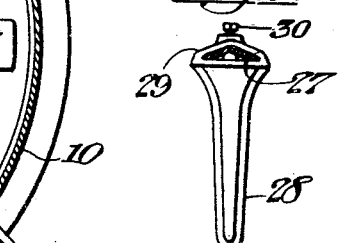

UNITED STATES PATENT OFFICE.

OLIVER Z. HOWARD, OF NEW YORK, N. Y., ASSIGNOR TO THE DIAMOND MATCH COMPANY, OF CHICAGO, ILLINOIS, A CORPORATION OF ILLINOIS.

MIXING AND AGITATING MECHANISM FOR EXTRACTOR-VATS, &c.

1,258,334.  Specification of Letters Patent.  Patented Mar. 5, 1918.

Application filed September 14, 1916.  Serial No. 120,013.

*To all whom it may concern:*

Be it known that I, OLIVER Z. HOWARD, a citizen of the United States, and resident of the city and county of New York and State of New York, have invented certain new and useful Improvements in Mixing and Agitating Mechanism for Extractor-Vats, &c., of which the following is a specification.

This invention relates to means for mixing and agitating the contents of extractor vats and the like; having reference more especially to mechanism for use in connection with vats which are employed in the process of recovering soluble salts from kelp char and analogous substances. In the performance of such process char and water are mixed and allowed to settle within the vat; a more or less saturated solution of the salts thus extracted from the char is drained from the vat, and the more or less solid body of residual char is then mixed with extraction liquor and flushed into a succeeding vat as fully set out in an application for patent filed simultaneously herewith by myself and Frederick V. D. Cruser.

The object of my present invention is to provide a mechanism of simple and efficient construction and operation whereby an intimate mixture of the char and extraction liquor within the vat is attained, and whereby also the residual char is agitated and disintegrated to insure its ready fluid admixture with the flushing liquor.

To this end my invention, stated generally, comprises a mixing and agitating structure within the vat, means for rotating and vertically moving said structure, and means for automatically arresting the operation of the structure at each downward and upward limit of its travel.

The invention also comprises novel features of construction and combinations of parts, all of which will be hereinafter described and claimed.

In the annexed drawings—

Fig. 2 is a longitudinal vertical section, enlarged, of the actuating and tripping mechanism for the mixing and agitating structure, showing the parts in the relative positions which they occupy as the said structure approaches the limit of its downward travel.

Fig. 3 is an elevation of a part of the tripping mechanism showing the elements in their relative positions when the operation of the mixing and agitating structure is arrested.

Fig. 4 is a plan of Fig. 1.

Fig. 5 is a transverse section through the vat as on the line 5—5 of Fig. 1.

Fig. 6 is a transverse vertical section, through the drive shaft, and adjuncts, as on the line 6—6 of Fig. 1.

Fig. 7 is a sectional detail of the mixing and agitating structure, as on the line 7—7 of Fig. 1.

Figure 1:
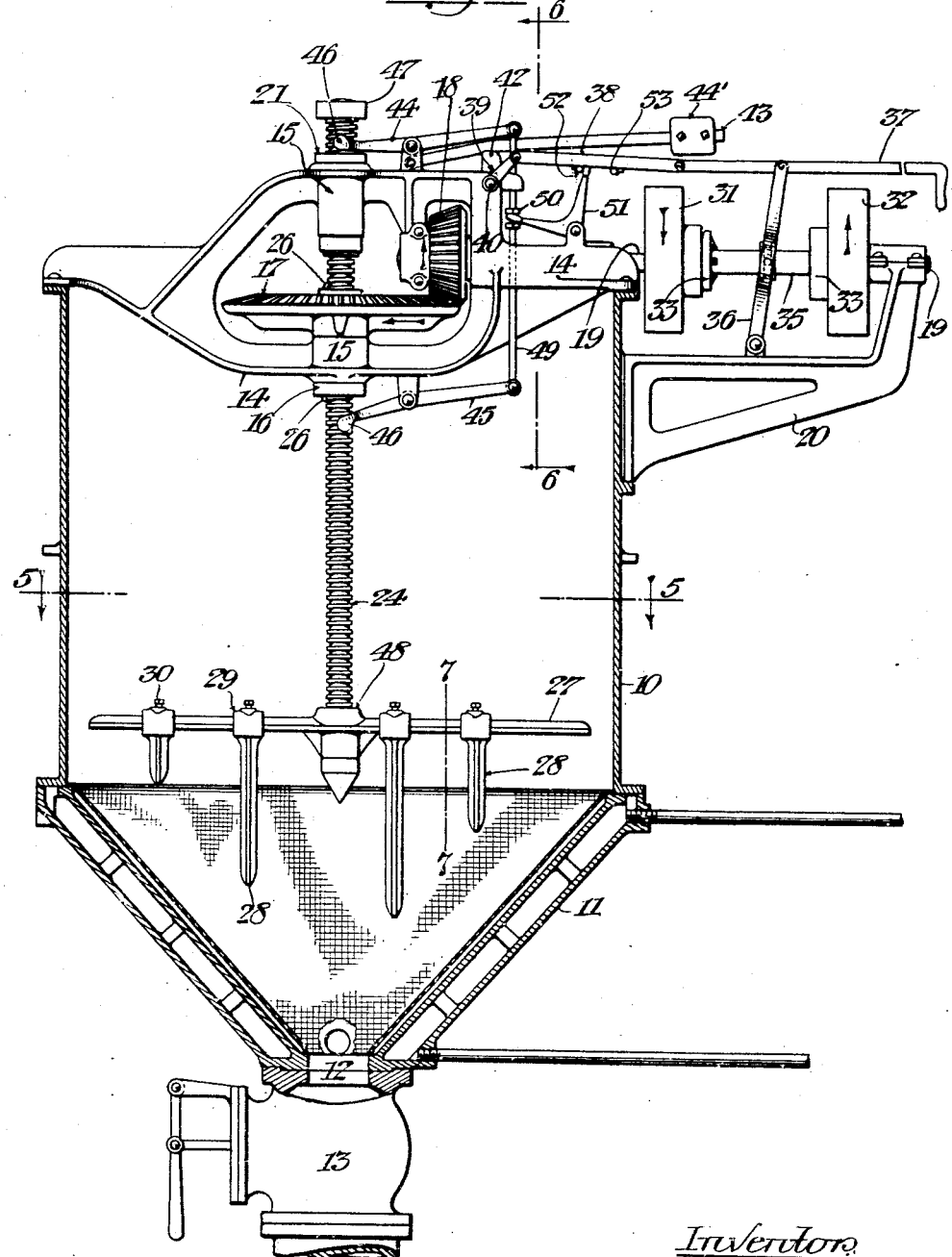
Figure 1 is a vertical section of an extraction vat equipped with mechanism embodying a preferred form of my invention, showing the parts in the relative positions which they occupy during the upward travel of the mixing and agitating structure.

Referring to the drawings, 10 designates a substantially cylindrical vat having a tapering steam jacketed bottom portion 11 terminating in a discharge opening 12 which is equipped with a suitable valve structure 13 by the manipulation of which the more or less aqueous contents of the vat can be discharged at will. Supported on the top of the vat is a bridge-frame 14 having vertically spaced bearing members 15 in axial alinement with the vat.

In the lower member is seated a vertically-disposed bushing 16 to which is keyed a bevel gear wheel 17 in mesh with a similar wheel 18 on a horizontal power-driven shaft 19 which has its bearings in the frame 14 and in a suitably-disposed bracket 20 extending from the vat, as shown. In the upper member is fixed an interiorly-threaded bushing 21 which constitutes a nut.

Extending centrally through the bushing 16 and the nut 21 is a vertical screw-shaft 24 with the thread of which the nut is operatively engaged. This shaft is provided with a longitudinal groove or key-way 25 into which is slidingly fitted a spline 26 on the bushing 16, whereby during the rotation of said bushing through the co-action of the drive shaft and the gears 17, 18, the screw shaft is positively rotated to effect the raising or the lowering of the screw-shaft as the direction of rotation of the drive shaft may dictate.

On the lower end of the screw-shaft is fixed a mixing and agitating structure comprising a transverse bar 27 having rigid depending prongs 28 arranged in spaced relation to each other. These prongs each comprise a tapering member having a looped or slotted upper portion 29 which is slid upon the bar and is adjustably secured in place thereon by a suitably-disposed set-screw 30. The bar is relatively thin and wide in cross-section, and the prongs are so positioned thereon that those on one radial portion of the bar rotate in concentric paths alternating with the paths of the prongs on the other portion of the bar. (See Figs. 1, 5 and 7.) Hence during their compound rotary and vertical travel the bar and prongs conjointly accomplish the thorough and efficient mixing and agitation of the contents of the vat.

As a simple and efficient means automatically to arrest the rotation of the drive shaft 19 at each downward and upward limit of travel of the screw-shaft and its mixing and agitating structure, I provide actuating means under the control of the screw-shaft, as follows: On the drive shaft are loosely mounted two pulleys 31, 32 which are driven in opposite directions to each other from a suitable source of power. Each of the pulleys is provided with an appropriate clutch member 33 which is operatively connected by toggle arms 34 with a sleeve 35 on the drive shaft, whereby when the sleeve is fully shifted to the right or to the left the corresponding pulley is clutched to the shaft, and whereby when the sleeve is shifted to a neutral position midway between the pulleys both pulleys are loose on the shaft. The clutch sleeve is loosely connected to an upstanding lever 36 having its lower end fulcrumed on a lug on the bracket 20 above referred to. The upper end of the lever 36 is pivoted to a horizontal shifter bar 37 one end of which extends toward the top of the vat while the other end extends outwardly and is provided with a suitable handle by means of which the bar can be readily manipulated in order to clutch either pulley to its shaft, as desired.

The inner end of the shifter bar is connected by means of a link 38 with a crank-arm 39 which is carried by one end of a transverse rocker-shaft 40 having its bearings in webs 41 on the bridge-frame; such connection constituting, in effect, a toggle. Fast on the other end of the rocker-shaft is a crank-like cam 42 upon which bears an overhanging arm 43 which is pivoted at one end to a lug on the bridge-frame 14 and is equipped at its free end with an adjustable weight 44'. By actuation of the rocker-shaft 40, the cam 42 is shifted so as to vary its position of contact with relation to the weighted arm, as will presently appear.

Pivoted to lugs on the top and bottom of the bridge-frame 14 are two levers 44, 45 respectively, the inner ends of which are bifurcated, as at 46, to embrace the screw-shaft 24. (See Fig. 4.) The upper end of this shaft is provided with a head 47 which overhangs the proximate end of the upper lever 44 and is adapted to bear thereagainst when the screw-shaft approaches its lowermost position; and the bar 27 at the lower end of the screw-shaft is provided with a hub 48 which is adapted to impinge against the bifurcated end of the lower lever 45 when said shaft approaches its uppermost position. The outer ends of these levers 44, 45 are coupled by means of a vertical link 49 having thereon spaced collars 50 between which extends the bifurcated end of one of the arms of a bell-crank lever 51 which is pivoted on a lug suitably-disposed on the bridge-frame. The end of the other or upstanding arm of this lever is provided with a bifurcated portion which extends between a pair of spaced collars or stops 52, 53 on an extension 54 of the shifter bar 37.

The construction and arrangement of the parts just described are such that when they occupy the relative positions illustrated in Fig. 1 the pulley 32 is clutched to the drive shaft, and accordingly the screw-shaft is rotated in a manner to raise the same. At this stage the joint of the toggle member is positioned at the right of the axis of the cam 42, and the latter is so disposed that the left or up-standing member thereof supports the overhanging weighted arm in raised position, as shown. When the screw-shaft approaches its uppermost position the hub 48 of the bar 27 impinges against the opposing end of the lever 45 and forcibly raises it, thereby lowering the opposite end of the lever, together with the link 49, and the arm of the crank-lever 51 which is attached to the link. The other arm of the crank-lever being swung inward abuts against the opposing inner stop 52 on the extension of the shifter bar and moves the latter and the toggle toward the vat, thus partially turning the rock-shaft and its cam 42. The movement of this cam is sufficient to dispose the upstanding member thereof beyond the vertical, and hence the force of the weighted arm 43 exerts a turning movement on the cam and throws it to the left, thereby unclutching the active pulley 32 from the drive shaft and arresting the operation of the latter. At this stage the clutch mechanism is neutral, and the cam occupies the position illustrated in Fig. 3 with the weighted arm 43 bearing upon the two members of said cam and thus temporarily locking it and its connections.

When in the subsequent operation of the apparatus it is desired to lower the screw-shaft the operator pushes the shifter bar toward the vat, thus clutching the left hand pulley 31 to the drive shaft. The joint of the toggle members is now positioned at the left of the center of the cam, as illustrated in Fig. 2, and the right or up-standing member of said cam supports the overhanging weighted arm in raised position. When the screw-shaft approaches its lowermost limit the head 47 thereon impinges against the opposing lever arm and forcibly lowers it, thereby raising the other arm of the lever, the link 49, and the inner arm of the crank-lever 51, in a manner to effect a reversal of the unclutching operation above described; the cam 42 being moved to its locking or neutral position and being temporarily locked therein by the action of the weighted arm thereon, as illustrated in Fig. 3. Consequently the operation of the drive shaft and the screw-shaft is again arrested. When it is desired subsequently to raise the screw-shaft, the operator pulls the shifter bar to the right and the parts again assume the relative positions shown in Fig. 1. At the end of each upward and downward movement of the rotating screw shaft its operation is automatically arrested, and the parts are temporarily locked in a neutral position in readiness for manual shifting and re-starting by the operator, as above described.

My invention is not limited to the particular details of construction shown and described, as the mechanism may be modified without departing from the spirit of the invention as defined in the appended claims.

I claim—

1. The combination with a vessel, of a mixing and agitating structure therein, power-driven means for rotating and vertically reciprocating said structure, and means for automatically arresting the operation of said structure at each limit of its vertical travel.

2. The combination with a vessel, of a mixing and agitating structure therein, a vertical screw-shaft carrying said structure, a nut member with which said shaft is operatively engaged, means for rotating said shaft to effect the vertical reciprocation thereof, and means controlled by said shaft for automatically arresting the operation of the shaft at the respective limits of its vertical travel.

3. The combination with a vessel, of a mixing and agitating structure therein, a vertical screw-shaft carrying said structure, a nut member with which said shaft is operatively engaged, a drive shaft, gearing between the drive shaft and the screw-shaft, power transmitting means for actuating the drive shaft, means whereby said transmitting means may be operatively engaged with the drive shaft to effect the rotation of the screw-shaft and its travel up or down, and means actuated by said screw shaft at the respective limits of its vertical travel for rendering said power transmitting means inactive on the drive shaft.

4. The combination with a vessel, of a mixing and agitating structure therein, a vertical screw-shaft carrying said structure and having spaced lever actuating portions, means, including a drive shaft, for rotating and vertically moving said screw-shaft, two oppositely driven pulleys loosely mounted on said drive shaft, clutch devices whereby either of said pulleys can be rendered fast or loose on the drive shaft, a shifter bar for actuating said clutch devices, a toggle lever connection for said bar, a cam element operative with said connection, a weighted arm bearing on the cam element, levers extending into the vertical paths of the respective lever-engaging portions on the screw-shaft, a link connecting said levers, and operative connection between said link and the shifter bar.

Signed at Burmester in the county of Tooele and State of Utah this fifth day of September A. D. 1916.

OLIVER Z. HOWARD.

Copies of this patent may be obtained for five cents each, by addressing the "Commissioner of Patents Washington, D. C."